(12) United States Patent
Du et al.

(10) Patent No.: US 10,005,896 B2
(45) Date of Patent: Jun. 26, 2018

(54) RUBBER COMPRISED OF PRODUCT OF DIENE-BASED ELASTOMER, BRANCHED POLYETHYLENIMINE OLIGOMER AND REINFORCING FILLER, AND TIRE WITH COMPONENT

(71) Applicant: The Goodyear Tire & Rubber Company, Akron, OH (US)

(72) Inventors: Ling Du, Fairlawn, OH (US); Ralf Mruk, Lipperscheid (LU); Leena Nebhani, New Delhi (IN)

(73) Assignee: The Goodyear Tire & Rubber Company, Akron, OH (US)

( * ) Notice: Subject to any disclaimer, the term of this patent is extended or adjusted under 35 U.S.C. 154(b) by 104 days.

(21) Appl. No.: 15/092,656

(22) Filed: Apr. 7, 2016

(65) Prior Publication Data

US 2017/0292012 A1 Oct. 12, 2017

(51) Int. Cl.
*C08L 9/00* (2006.01)
*C08L 9/06* (2006.01)
*B60C 1/00* (2006.01)
*B60C 11/00* (2006.01)

(52) U.S. Cl.
CPC ............. *C08L 9/06* (2013.01); *B60C 1/0016* (2013.01); *B60C 11/0008* (2013.01); *B60C 2011/0025* (2013.01); *C08L 9/00* (2013.01)

(58) Field of Classification Search
CPC ...................................................... C08L 9/00
See application file for complete search history.

(56) References Cited

U.S. PATENT DOCUMENTS

| | | | | |
|---|---|---|---|---|
| 3,884,285 | A | * 5/1975 | Russell | ................. B60C 1/0016 152/209.5 |
| 7,224,407 | B2 | 5/2007 | Yoshii et al. | |
| 9,090,757 | B2 | 7/2015 | Mruk et al. | |
| 2003/0188818 | A1 * | 10/2003 | Drvol | ....................... B60C 1/00 152/564 |
| 2008/0103287 | A1 * | 5/2008 | Chino | .................... C08C 19/22 528/421 |
| 2015/0018481 | A1 | 1/2015 | Mruk et al. | |

FOREIGN PATENT DOCUMENTS

GB 1304927 A * 1/1973 ............. C08K 5/005
WO 2016047633 7/2017

OTHER PUBLICATIONS

Polyethylenimine from Wikipedia, Polyethylenimine from Wikipedia, US.
Ono, et al., Method for Producing Silica-fille Rubber Composition, Chemical Abstracts, Apr. 1, 2016, XP002772990.
EPO search report received by Applicant dated Aug. 30, 2017.

* cited by examiner

*Primary Examiner* — Michael F Pepitone
(74) *Attorney, Agent, or Firm* — Henry C. Young, Jr.

(57) ABSTRACT

The invention relates to rubber comprised of a reaction product of at least one diene-based elastomer, branched polyethylenimine oligomer and filler reinforcement comprised of at least one of rubber reinforcing carbon black and precipitated silica. The invention further relates to a tire with a component comprised of such rubber composition.

1 Claim, 1 Drawing Sheet

RUBBER COMPRISED OF PRODUCT OF DIENE-BASED ELASTOMER, BRANCHED POLYETHYLENIMINE OLIGOMER AND REINFORCING FILLER, AND TIRE WITH COMPONENT

FIELD OF INVENTION

This invention relates to preparation of a rubber comprised of an interaction product of at least one diene-based elastomer, branched polyethylenimine oligomer and filler reinforcement comprised of at least one of rubber reinforcing carbon black and precipitated silica. The invention further relates to a tire with a component comprised of such rubber composition.

BACKGROUND OF THE INVENTION

Rubber compositions for components for pneumatic rubber tires are usually comprised of at least one diene-based elastomer and reinforcing filler comprised of at least one of rubber reinforcing carbon black and precipitated silica. For tire treads, it is often desired for such rubber composition to promote low hysteresis for the tire component as exhibited by at least one of relative high rebound property and relative low tangent delta property for the rubber composition and also to promote abrasion resistance to thereby promote tire wear resistance.

For this invention, it is desired to evaluate providing a branched polyethylenimine oligomer (sometimes referred to as a PEI, or branched PEI oligomer) to promote at least one of such physical properties for such rubber composition, particularly for a tire with component thereof.

A branched polyethylenimine oligomer (branched PEI oligomer) is a polymer of a complex structured network comprised of in-chain amine groups with spacer between the amine groups composed of aliphatic hydrocarbon "—CH₂CH₂—" groups. The amine groups of branched PEI oligomers are composed of a combination of primary, secondary and tertiary amine groups. The monomer is reported as being a three-membered ring which might sometimes be referred to as an aziridine. The aziridine may be represented as:

Two corners of the monomer are composed of —CH₂— linkages. The third corner is a secondary amine group, =NH. In the presence of a catalyst, the monomer may be converted, by ring opening polymerization, into a highly branched polymer which may contain reportedly, for example, about 33 percent primary amine groups, about 40 percent secondary amine groups and about 27 percent tertiary amine group.

It is to be appreciated that the branched PEI oligomer can promote sulfur vulcanization of diene-based elastomers in a sense of being in the nature of a secondary sulfur vulcanization accelerator. An inclusion of the branched PEI oligomer in a diene-based rubber composition might be expected to promote an unwanted premature vulcanization of the rubber composition which is sometimes referred to as "scorching". Therefore, it may be appropriate to use only a minimal amount of the branched PEI oligomer and to include a compound in the rubber composition which may act as a vulcanization retarder. However, conventional sulfur vulcanization retarder compounds such as, for example, n-cyclohexylthiophthalimide, are believed to be relatively insufficient for promoting a reduction of premature scorching when applying a branched PEI oligomer to a rubber composition. In contrast, use of carboxylic acids containing phenolic moieties such as, for example p- or m-hydroxy benzoic acid as well as salicylic acid and methylated salicylic acid, particularly salicylic acid, is considered to be more appropriate for use as a sulfur vulcanization retarder to retard premature scorching for use of a branched PEI oligomer with the diene-based elastomer-containing rubber composition.

In the description of this invention, the term "phr" is used to designate parts by weight of a material per 100 parts by weight of elastomer. The terms "rubber" and "elastomer" may be used interchangeably unless otherwise indicated. The terms "vulcanized" and "cured" may be used interchangeably, as well as "unvulcanized" or "uncured", unless otherwise indicated.

SUMMARY AND PRACTICE OF THE INVENTION

In accordance with this invention, a method of preparing a rubber composition is provided, wherein said rubber composition is comprised of, based on parts by weight per 100 parts by weight rubber (phr):

(A) 100 phr of at least one conjugated diene-based elastomer, (B) about 0.05 to about 1, alternately about 0.1 to about 0.6, phr of branched polyethylenimine oligomer (branched PEI oligomer) optionally together with an organic acid such as carboxylic acid containing a phenolic moiety such as for example p- or m-hydroxy benzoic acid as well as salicylic acid and methylated salicylic acid, particularly salicylic acid, desirably in a weight ratio of from about 1/1 to about 1/3 of branched PEI to said organic acid, (C) about 30 to about 130, alternately about 50 to about 125 phr of reinforcing filler comprised of:
  (1) rubber reinforcing carbon black,
  (2) precipitated silica (synthetic amorphous precipitated silica), or
  (3) combination of rubber reinforcing carbon black and precipitated silica, (D) silica coupler for said precipitated silica having a moiety reactive with hydroxyl groups on said precipitated silica and another different moiety interactive with said diene-based elastomer(s), and (E) about 0.1 to about 8 phr of zinc oxide and from about 0.5 to about 8 phr of fatty acid with a weight ratio of zinc oxide to fatty acid, for example, in a range of from about 1/5 to about 1/1;

wherein said method comprises blending said elastomer(s), reinforcing filler, branched polyethylenimine oligomer, coupling agent for said precipitated silica reinforcing filler (when precipitated silica is used as a reinforcing filler), zinc oxide and fatty acid and optionally said organic acid, in preparatory sequential mixing steps (sometimes referred to as non-productive sequential mixing steps) followed by a subsequent final mixing step (sometimes referred to as a productive mixing step) in which sulfur curative and at least one sulfur vulcanization accelerator are added, wherein said zinc oxide and fatty acid are blended in a preparatory mixing step subsequent to a preparatory mixing step in which said branched polyethylenimine oligomer, diene-based elastomers, carbon back, precipitated silica and silica coupler are blended with said rubber composition.

Said organic acid, particularly said salicylic acid, if used, may be added to a preparative (non-productive) mixing step and/or to the final (productive) mixing step, usually desirably in a preparative (non-productive) mixing step.

The purpose of blending the zinc oxide and fatty acid subsequent to and separate from the blending of the branched polyethylenimine oligomer (in a preparatory, non-productive mixing step) is to minimize a reaction of the zinc oxide and fatty acid with the branched polyethylenimine oligomer prior to its exposure to and thereby in the absence of its interaction with the diene-based elastomers and precipitated silica.

In practice, such fatty acid may be comprised of, for example, at least one of stearic acid, palmitic acid and oleic acid and any mixture thereof.

In practice the silica coupler and precipitated silica may be added to the rubber composition to interact together in situ within the rubber composition.

Alternately the silica coupler may be pre-reacted with the precipitated silica to form a composite thereof which is added to the rubber composition. In such case, additional silica coupler may be added to the rubber composition, if desired.

Representative examples of such silica coupler are bis(3-triethoxysilylpropyl) polysulfide having an average of from about 2 to about 4 connecting sulfur atoms in its polysulfidic bridge or an alkoxyorganomercaptosilane. In one embodiment, said bis(3-triethoxysilylpropyl) polysulfide has an average of from about 2 to about 2.6 or an average of from about 3.4 to about 4 connecting sulfur atoms in its polysulfidic bridge.

In further accordance with this invention, a rubber composition is provided as being prepared by said method.

In further accordance with this invention, a tire is provided having a component comprised of said rubber composition. In one embodiment, such component is a tire tread.

A significant aspect of the invention is the inclusion of the branched polyethylenimine oligomer in the rubber composition for which its amine groups, particularly its primary and secondary amine groups, may interact with hydroxyl groups on said precipitated silica and with the surface of said rubber reinforcing carbon black (e.g. with, for example, one or more of aldehyde, carboxyl, hydroxyl and carbonyl groups on the surface of said rubber reinforcing carbon black) to thereby promote reinforcement of said diene-based elastomers with said precipitated silica and rubber reinforcing carbon black.

To further describe the invention, a drawing is provided.

BRIEF DESCRIPTION OF THE DRAWING

The drawing is provided to illustrate a prospective branched polyethylenimine oligomer and to illustrate a prospective composite of a branched polyethylenimine oligomer, elastomer as a diene-based polymer and precipitated silica particles.
The Drawing FIG. 1 (FIG. 1) of the drawing presents a prospective chemical structure of a highly branched polyethylenimine oligomer.

Figure 1:
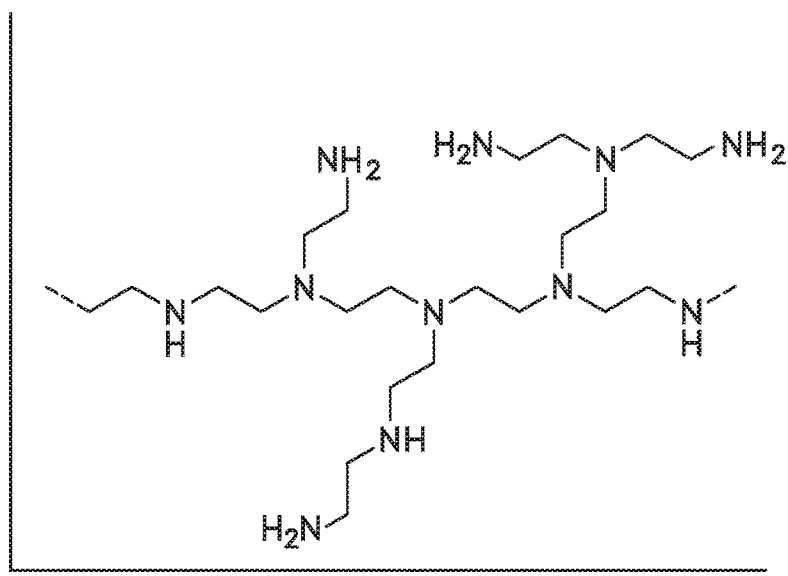
Figure 2:
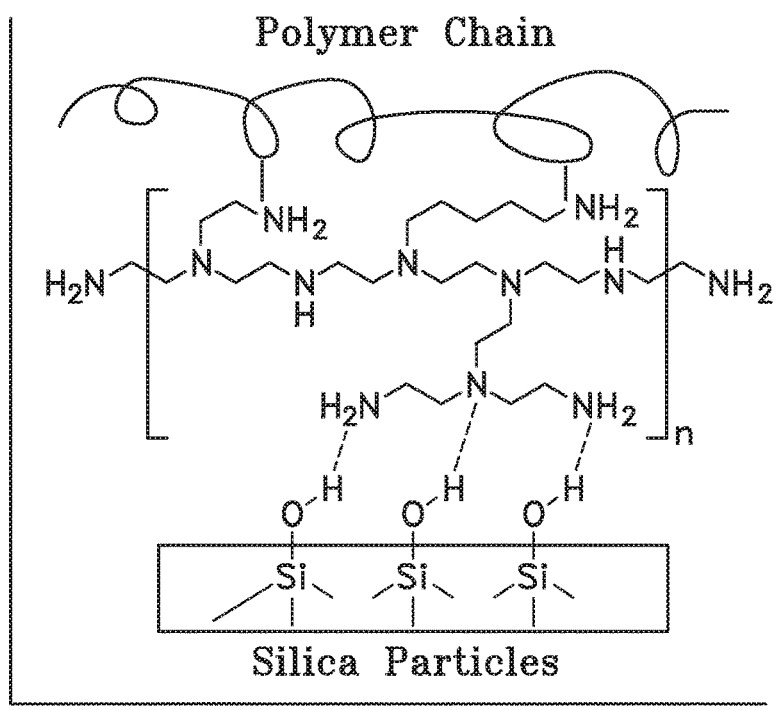
FIG. 2 (FIG. 2) of the drawing presents a prospective composite comprised of a highly branched polyethylenimine oligomer which couples an elastomer (polymer chain) comprised of a diene-based elastomer (the diene-portion of the elastomer not shown) to precipitated silica reinforcing filler particles (silica particles) through an interaction of amine groups of the polyethylenimine oligomer with hydroxyl groups contained on the precipitated silica filler particles.

The precipitated silica, rubber reinforcing carbon black and PEI (oligomer) can be mixed with the rubber composition in one or more non-productive mix stages. Zinc oxide and salicylic acid are preferably added subsequent to the branched PEI oligomer addition and, more preferably, in a subsequent non-productive mixing stage to minimize their premature interaction with the branched PEI oligomer. In a subsequent and final mixing stage, sulfur curative and cure accelerator(s) are then mixed with the rubber composition. The terms "non-productive" and "productive" mix stages are well known to those having skill in the rubber mixing art.

The following Example is presented to illustrate one aspect of the invention and is not intended to be limiting. The parts and percentages are by weight unless otherwise designated.

EXAMPLE I

An exemplary Control rubber Sample A and exemplary Experimental rubber Samples B, C and D are provided to illustrate preparation of rubber compositions.

Control rubber Sample A is composed of diene-based elastomers and reinforcing filler as precipitated silica with a minimal content of carbon black.

Experimental rubber Sample B is similar to Control rubber Sample A except that it contains the branched polyethylenimine oligomer and the salicylic acid as a vulcanization retarder (scorch retarder).

For this Example, both zinc oxide and fatty acid were blended subsequent to (in a mixing step subsequent to) addition of the branched polyethylenimine oligomer to minimize a pre-mature interaction of the polyethylenimine oligomer with the zinc oxide and fatty acid and to therefore maximize reactions of the branched polyethylenimine oligomer with the diene-based elastomers, precipitated silica and carbon black.

Experimental rubber Samples C and D are similar to Experimental rubber Sample B except for higher loadings of the branched polyethylenimine oligomer and the salicylic acid.

The basic formulation for the Control rubber Sample A and Experimental rubber Samples B, C and D are illustrated in the following Table 1 where the ingredients are expressed in terms of parts by weight per 100 parts of rubber (phr) unless otherwise indicated.

The rubber compositions may be prepared, for example, by mixing the ingredients in at least two sequential preparatory (non-productive) mixing steps (e.g. NP1 and NP2) at an elevated temperature without sulfur and sulfur cure accelerators which are thereafter added in a final (productive) mixing step (PR) usually at a lower mixing temperature. The rubber composition may then sheeted out and cooled to below 50° C. between each of the non-productive mixing steps and prior to the productive mixing step. Rubber mixing steps involving non-productive and productive mixing steps are generally well known to those having skill in such art.

For this Example the branched polyethylenimine oligomer, zinc oxide and fatty acid are blended in non-productive mixing steps with the rubber composition in a mixing step separate from and subsequent to the addition of the is branched polyethylenimine oligomer.

TABLE 1

| Non-Productive Mixing Step (NP1) | Parts (phr) | | | |
|---|---|---|---|---|
| | Control A | Exp B | Exp C | Exp D |
| SSBR rubber (styrene/butadiene rubber)[1] | 67 | 67 | 67 | 67 |
| Cis 1,4-polybutadiene rubber[2] | 33 | 33 | 33 | 33 |
| Carbon black, rubber reinforcing (N330)[3] | 5 | 5 | 5 | 5 |
| Precipitated silica[4] | 95 | 95 | 95 | 95 |
| Silica coupler[5] | 7.6 | 7.6 | 7.6 | 7.6 |
| Wax, crystalline and paraffin | 1.5 | 1.5 | 1.5 | 1.5 |
| Rubber processing oil | 28 | 28 | 28 | 28 |
| Antioxidant(s) | 3 | 3 | 3 | 3 |
| Branched polyethylenimine oligomer | 0 | 0.2 | 0.4 | 0.6 |
| Zinc oxide | 2 | 0 | 0 | 0 |
| Fatty acid[6] | 5 | 0 | 0 | 0 |
| Non-Productive Mixing Step (NP2) | | | | |
| Zinc oxide | 0 | 2 | 2 | 2 |
| Fatty acid[6] | 0 | 5 | 5 | 5 |
| Salicylic acid | 0 | 0.4 | 0.8 | 1.2 |
| Productive Mixing Step (PR) | | | | |
| Sulfur | 1.6 | 1.6 | 1.6 | 1.6 |
| Accelerator(s)[8] | 2.8 | 2.8 | 2.8 | 2.8 |

[1]Styrene/butadiene elastomer (SSBR) prepared by solvent solution polymerization and end-functionalized with what is understood to be alkoxy and a combination of amine and thiol functional groups and having a styrene content of about 21 percent rubber as SLR4606 ™ from Trinseo
[2]Cis 1,4-polybutadiene rubber as BUD1223 ™ from The Goodyear Tire & Rubber Company
[3]Rubber reinforcing carbon black as N330, an ASTM designation
[4]Precipitated silica as Zeosil 1165MP ™ from Solvay
[5]Silica coupler comprised of a bis(3-triethoxysilylpropyl) polysulfide containing an average from about 2 to about 2.6 connecting sulfur atoms in its polysulfidic bridge as Si266 ™ from Evonik
[6]Mixture of fatty acids comprised of stearic, palmitic and oleic acids
[7]Polyethylenimine oligomer as a branched polyethylenimine oligomer from Sigma Aldridge
[8]Sulfenamide sulfur cure accelerator The following Table 2 represents the uncured and cured behavior and various physical properties of the rubber compositions based upon the basic formulation of Table 1 and reported for Control rubber Sample A and Experimental rubber Samples B, C and D.

TABLE 2

| Non-Productive Mixing Step (NP1) | Samples (phr) | | | |
|---|---|---|---|---|
| | Control A | Exp B | Exp C | Exp D |
| SSBR elastomer | 67 | 67 | 67 | 67 |
| Cis 1,4-polybutadiene rubber | 33 | 33 | 33 | 33 |
| Rubber reinforcing carbon black | 5 | 5 | 5 | 5 |
| Precipitated silica | 95 | 95 | 95 | 95 |
| Polyethylenimine, branched oligomer | 0 | 0.2 | 0.4 | 0.6 |
| Salicylic acid | 0 | 0.4 | 0.8 | 1.2 |
| Properties | | | | |
| RPA test (Rubber Process Analyzer), 10% strain, 11 Hertz, 100° C. | | | | |
| Storage modus G' (MPa) | 2.2 | 1.9 | 2.1 | 2.2 |
| Tan delta | 0.13 | 0.11 | 0.12 | 0.12 |
| Rebound (60° C.), (higher is better) (percent) | 51 | 58 | 56 | 53 |
| DIN abrasion (lower is better)[1] | 123 | 101 | 106 | 109 |
| Stress-strain | | | | |
| Tensile strength (MPa) | 14.1 | 14.9 | 14.2 | 13.7 |
| Elongation at break (%) | 376 | 367 | 348 | 335 |
| 300% modulus, ring, (MPa) | 12 | 13 | 13.1 | 13.5 |
| Cure: MDR test, 150° C. | | | | |
| Delta torque (dN-m) | 20.7 | 17 | 17.7 | 17.6 |
| T25 (minutes) | 9.2 | 7.5 | 6.6 | 5.9 |
| T90 (minutes) | 16.8 | 13.9 | 12.2 | 10.8 |

[1]DIN53516, relative volume loss

It can be seen from Table 2 that the addition of 0.2 phr of the branched polyethylenimine oligomer significantly and beneficially reduced the hysteresis of the rubber composition as evidenced by the increased 60° C. rebound value of 58 percent which is about a 14 percent beneficial improvement for Experimental rubber Sample B as compared to a value of 51 percent for Control rubber Sample A which is believed be an indication of better elastomer/silica filler interaction via the branched PEI oligomer.

It can further be seen from Table 2 that the addition of 0.2 phr of the branched polyethylenimine oligomer significantly and beneficially increased the DIN abrasion resistance to a value of 101 for Experimental rubber Sample B as compared to a value of 123 for Control rubber Sample A which is about an 18 percent improvement which is believed be an indication of better bonding of the elastomer to the precipitated silica filler via the PEI.

Therefore, it is concluded that rather minimal amount of addition of the branched polyethylenimine oligomer (0.2 phr) to the rubber composition (prior to addition of zinc oxide and fatty acid) can significantly and beneficially improve (reduce) predictive rolling resistance for a tire with tread of Experimental rubber Sample B composition as well as improve (reduce) its predictive tread wear.

The increase in amounts of branched polyethylenimine oligomer and salicylic acid for Experimental rubber Samples C and D also resulted in a beneficial increase in rebound values and beneficial decrease in abrasion values.

EXAMPLE II

This Example is provided to illustrate preparation of a precipitated silica reinforced rubber composition in which a branched polyethylenimine oligomer is blended together in the same mixing stage (step) with zinc oxide and fatty acid in a non-productive mixing step with the rubber composition.

An exemplary Control rubber Sample A from Example I and Experimental rubber Samples E, F and F provided in this Example II are presented to illustrate prior experimental work relating to methodology of use of the branched polyethylenimine oligomer for the precipitated silica reinforced rubber composition.

Control rubber Sample A contains diene-based elastomers and reinforcing filler.

Experimental rubber Sample E is similar to Control rubber Sample A except that it contained the branched polyethylenimine oligomer and the salicylic acid as a vulcanization retarder.

Experimental rubber Samples F and G are similar to Experimental rubber Sample E except for higher loadings of the branched polyethylenimine oligomer and the salicylic acid.

The basic formulation for the Control rubber Sample A and Experimental rubber Samples E, F and G are illustrated in the following Table 3 where the ingredients are expressed in terms of parts by weight per 100 parts of rubber (phr) unless otherwise indicated.

The rubber compositions were prepared in the manner of Example I except that, for Experimental Samples E, F and G, the branched polyethylenimine oligomer, zinc oxide and fatty acid are blended together in the same mixing non-productive mixing step.

TABLE 3

| Non-Productive Mixing Step (NP1) | Parts (phr) |
|---|---|
| SSBR rubber (styrene/butadiene rubber)[1] | 67 |
| Cis 1,4-polybutadiene rubber[2] | 33 |
| Carbon black, rubber reinforcing (N330)[3] | 5 |
| Precipitated silica[4] | 95 |
| Silica coupler[5] | 7.6 |
| Wax, crystalline and paraffin | 1.5 |
| Rubber processing oil | 28 |
| Antioxidant(s) | 3 |
| Branched polyethylenimine oligomer | 0.2 to 0.6 |
| Zinc oxide | 2 |
| Fatty acid[6] | 5 |
| Non-Productive Mixing Step (NP2) | |
| Salicylic acid | 0.4 to 1.2 |
| Productive Mixing Step (PR) | |
| Sulfur | 1.6 |
| Accelerator(s)[8] | 2.8 |

The following Table 4 represents the uncured and cured behavior and various physical properties of the rubber compositions based upon the basic formulation of Table 1, and reported for Control rubber Sample A (copied from Table 2 of Example I and Experimental rubber Samples E, F and G of this Example II.

TABLE 4

| | Cntrl A | Samples (phr) | | |
|---|---|---|---|---|
| | from Ex. I | Exp E | Exp F | Exp G |
| SSBR elastomer | 67 | 67 | 67 | 67 |
| Cis 1,4-polybutadiene rubber | 33 | 33 | 33 | 33 |
| Rubber reinforcing carbon black | 5 | 5 | 5 | 5 |
| Precipitated silica | 95 | 95 | 95 | 95 |
| Polyethylenimine, branched oligomer | 0 | 0.2 | 0.4 | 0.6 |
| Salicylic acid | 0 | 0.4 | 0.8 | 1.2 |
| Properties | | | | |
| RPA test (Rubber Process Analyzer), 10% strain, 11 Hertz, 100° C. | | | | |
| Storage modus G' (MPa) | 2.2 | 1.9 | 2.1 | 2.2 |
| Tan delta | 0.13 | 0.13 | 0.12 | 0.13 |
| Rebound (60° C.) (Higher is better) (percent) | 51 | 51 | 50 | 50 |
| DIN abrasion_ (lower is better)[1] | 123 | 124 | 122 | 120 |
| Cure: MDR test, 150° C. | | | | |
| Delta torque (dN-m) | 20.7 | 20 | 19.7 | 19.2 |
| T25 (minutes) | 9.2 | 7.9 | 6.9 | 5.7 |
| T90 (minutes) | 16.8 | 14.6 | 12.8 | 10.5 |

[1]DIN53516, relative volume loss

It can be seen from Table 4 that the benefit achieved in Example I (illustrated in its Table 3) in beneficially increasing the rubber composition's rebound and beneficially decreasing its abrasion loss (increasing its abrasion resistance) was not obtained for rubber Samples E, F and G where the zinc oxide and fatty acid were mixed together with the branched polyethylenimine oligomer in the same non-productive mixing step for the rubber composition (instead of mixing the zinc oxide and fatty acid subsequent to and separate from the branched polyethylenimine oligomer as previously illustrated in Example I for its Samples B, C and D).

It is concluded that the results observed in this Example II verify the beneficial discovery of addition of the zinc oxide and fatty acid subsequent to and separate from the branched polyethylenimine oligomer to the rubber composition in a non-productive mixing stage.

While certain representative embodiments and details have been shown for the purpose of illustrating the invention, it will be apparent to those skilled in this art that various changes and modifications may be made within the scope of the invention.

What is claimed is:

1. A method of preparing a rubber composition is provided wherein said rubber composition is comprised of, based on parts by weight per 100 parts by weight rubber (phr):

(A) 100 phr of at least one conjugated diene-based elastomer, (B) about 0.05 to about 1 phr of branched polyethylenimine oligomer, (C) about 30 to about 130 phr of reinforcing filler comprised of combination of rubber reinforcing carbon black and precipitated silica, (D) silica coupler for said precipitated silica consisting of bis(3-triethoxysilylpropyl) polysulfide containing an average in a range of 2 to about 2.6 connecting sulfur atoms in its polysulfidic bridge, and (E) about 0.1 to about 8 phr of zinc oxide and from about 0.5 to about 8 phr of fatty acid comprised of at least one of stearic, palmitic and oleic acid, wherein said method comprises blending said elastomer(s), carbon black and precipitated silica, reinforcing fillers, branched polyethylenimine oligomer, coupling agent for said precipitated silica reinforcing filler, zinc oxide and fatty acid in at least one of at least two preparatory sequential mixing steps followed by a blending sulfur curative and at least one sulfur vulcanization accelerator in a subsequent final mixing step;

wherein said zinc oxide and fatty acid are blended in a preparatory mixing step subsequent to a preparatory mixing step in which the said polyethylenimine oligomer is blended with said rubber composition wherein the weight ratio of zinc oxide to fatty acid is in a range of from about 1/5 to about 1/1 and wherein salicylic acid is blended in at least one of said preparatory mixing steps to provide a weight ratio of from about 1/1 to about 1/3 of said polyethylenimine to salicylic acid.

* * * * *